United States Patent [19]

Harvey

[11] Patent Number: 4,624,553
[45] Date of Patent: Nov. 25, 1986

[54] PHOTOGRAPHIC ENLARGER APPARATUS WITH CRITICAL FOCUSING PLATFORM FOR PHOTOSENSITIVE MEDIUM

[76] Inventor: Alwood E. Harvey, Boutonville Rd., Cross River, N.Y. 10518

[21] Appl. No.: 738,484

[22] Filed: May 28, 1985

[51] Int. Cl.$^4$ ............................................. G03B 27/52
[52] U.S. Cl. ........................................... 355/55; 355/72
[58] Field of Search ............................. 355/55, 72, 74

[56] References Cited

U.S. PATENT DOCUMENTS 2,369,897  2/1945  Hjort .................................... 355/74
4,084,903  4/1978  Pircher ................................. 355/53
4,473,292  9/1984  Mayer .................................. 355/72

FOREIGN PATENT DOCUMENTS 2070791  9/1981  United Kingdom ................. 355/72

Primary Examiner—Monroe H. Hayes
Attorney, Agent, or Firm—Curtis Ailes

[57] ABSTRACT

The final focus of a photographic enlarger is carried out by focusing the projected image on a photosensitive medium plane by adjusting the position of the projection lens, and then adjusting the distance of the photosensitive medium from the projection lens to achieve a critical focus.

11 Claims, 5 Drawing Figures

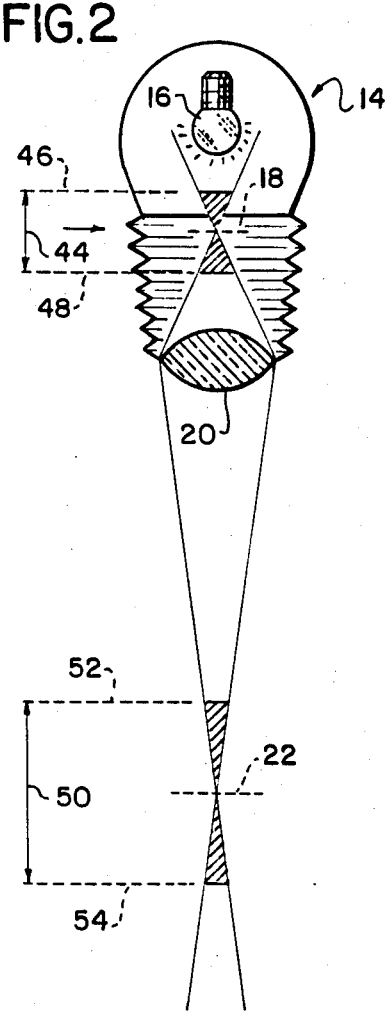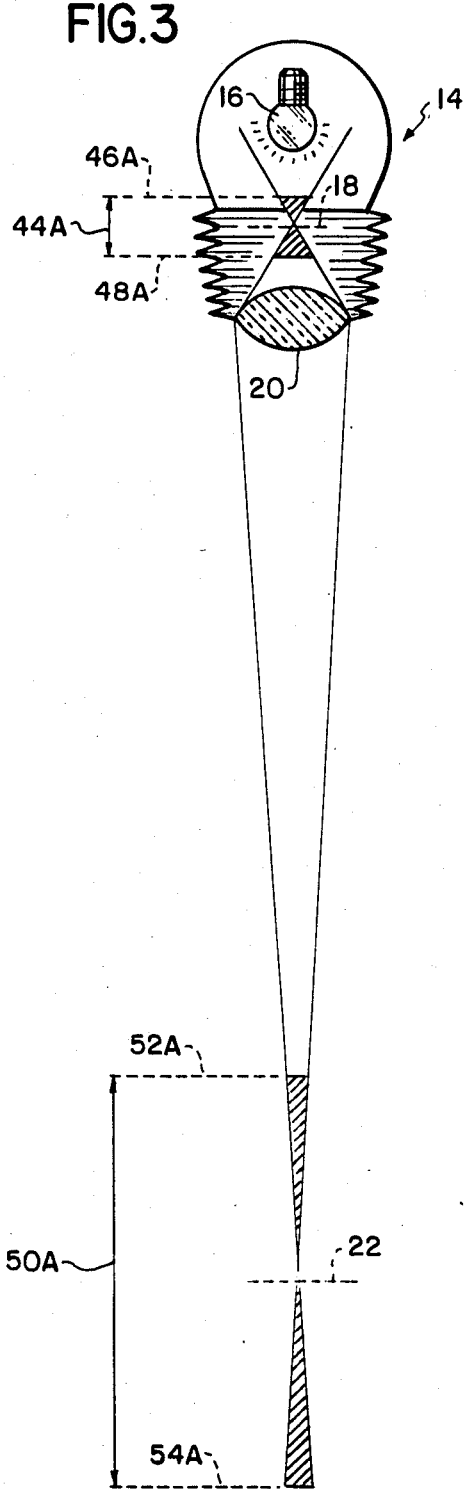

PHOTOGRAPHIC ENLARGER APPARATUS WITH CRITICAL FOCUSING PLATFORM FOR PHOTOSENSITIVE MEDIUM

BACKGROUND OF THE INVENTION

This invention particularly relates to an improved method and apparatus for a photographic enlarger which provides for substantial improvements in obtaining critical focus of the image to be enlarged upon the photosensitive medium upon which the enlargement is to be produced. The invention is particularly useful where a substantial enlargement is required.

In the operation of conventional enlarger apparatus, the amount of enlargement is generally determined by positioning the enlarger lens and the original which is to be enlarged at an appropriate distance above the plane at which the photosensitive medium is to be positioned, with the knowledge that the enlarger lens will produce the desired degree of enlargement when proper focus is achieved by vertical lens adjustment. The projected image of the original object which is to be enlarged is focused upon the photosensitive medium plane by careful adjustment of the position of the lens between the original object and the photosensitive medium plane. The greater the enlargement, the closer the lens must be positioned to the original, and the more difficult it is to position the lens with the great precision necessary for achieving critical focus.

Accordingly, it is one object of the present invention to provide an improved method and apparatus for achieving critical focus, and which overcomes the problem of precision positioning of the lens in achieving critical focus.

Another object of the invention is to provide a method and apparatus for achieving critical focus which is much more accurate than any method and apparatus presently available for that purpose.

Another problem with the conventional method and apparatus for achieving critical focus of an enlarger is that the operator must view the projected image closely in order to judge when the critical focus has been achieved. This means getting his head down near the photosensitive medium plane. At the same time, in order to adjust the lens position, he must reach up above his head to the lens stage adjustment knob, which is an awkward and difficult position in which to adjust the lens position with great precision.

Accordingly, it is another object of the invention to provide an improved method and apparatus for achieving critical focus in a manner which is much easier for the operator, and which avoids the problem of reaching over his head, as described above.

In order to achieve the ultimate in sharpness in photographic enlargements, it is virtually essential to focus the emulsion surface of the object precisely upon the emulsion surface of the photographic medium upon which the enlargement is being produced. With present conventional photographic enlargement equipment, it is extremely difficult to achieve this degree of precision in focus.

Accordingly, it is another object of the invention to provide for critical focusing with greater accuracy than has previously been achievable, and which does focus the emulsion surface of the object upon the emulsion surface of the photosensitive material, when that is desired.

Further objects and advantages of the invention will be apparent from the following description and the accompanying drawings.

SUMMARY OF THE INVENTION

In carrying out this invention there is provided a method of achieving the final focus of a photographic enlarger which consists of adjusting the critical focus of the projected image on the photosensitive medium by adjusting the distance between the projection lens of the enlarger and the surface of the photosensitive medium upon which the enlargement is to be produced.

In another aspect of the invention there is provided a photographic enlarger apparatus comprising means to hold the object to be enlarged, means for illuminating the object to be enlarged, lens means for projecting the object as an image upon a photosensitive medium, a photosensitive medium holding means for holding the photosensitive medium on which the enlargement is to be produced, said object holding means and said lens means being movable with respect to said photosensitive medium holding means for determining the degree of enlargement and for achieving a focusing of the projected image upon the photosensitive medium, said photosensitive medium holding means including means for precision position adjustment of the distance to said lens means to achieve a critical focus of the projected image upon the photosensitive medium.

BRIEF DESCRIPTION OF THE DRAWINGS

FIGS. 2 and 3 are schematic drawings illustrating the fundamental principles of the invention, and illustrating why the invention has greater utility for enlargements of greater size.

DESCRIPTION OF PREFERRED EMBODIMENTS

Figure 1:
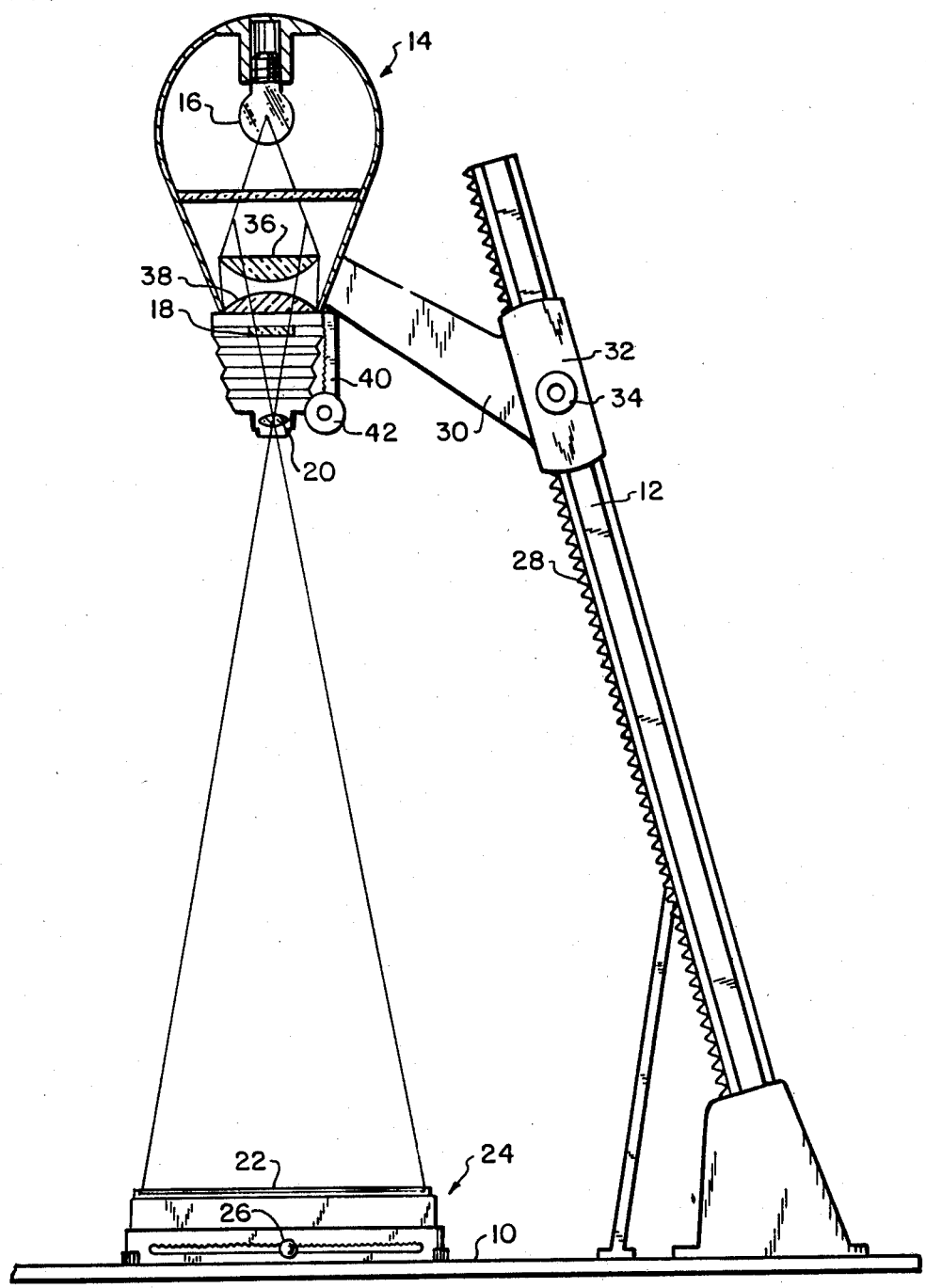
FIG. 1 is a side view, shown partially in section, of a photographic enlarger in accordance with the present invention.

Referring particularly to FIG. 1, there is illustrated a photographic enlarger apparatus in accordance with the invention. The enlarger includes a table 10, upon which there is fastened a rail 12 for adjustably supporting an enlarger projector device 14. The projector device 14 is shown in section, and includes a light source 16, an arrangement for holding a negative indicated at 18, and a projection lens 20. An easel for holding a photosensitive medium upon which the enlargement is to be produced is indicated at 22. The easel is supported by a focusing platform 24 which is a precision adjustment apparatus which is capable of vertical adjustment of the position of the easel 22 selectively in response to a horizontal movement of a control knob 26 in order to achieve a critical focus of the projected image upon the photosensitive medium.

In carrying out the method of the invention, the degree of enlargement of the original object 18 to be enlarged is determined by adjusting the vertical position of the enlargement projector apparatus 14 upon the support rail 12. The lens 20 is then adjusted up or down in order to focus the projected image upon the photosensitive medium held by the easel 22. If, at this point, the size of the enlargement is not correct, the apparatus 14 is lowered to reduce the size, or raised to increase the size, and the lens 20 is again adjusted to achieve a focus of the image upon the photosensitive medium at the easel 22. At this point, the adjustment knob 26 of focusing platform 24 is moved horizontally to move the easel 22 up or down to achieve critical focus. As will be explained more fully below, since the distance from the easel 22 to the lens 20 is much larger than the distance from the lens 20 to the object 18, a larger vertical motion of the easel 22 can be imparted by the focusing platform 24 without defocusing the image. Stated another way, achieving a critical focus by vertical movement of the easel 22 is much more easily accomplished than achieving a critical focus by movement of the lens 20 because a greater motion is required for a changing focus at the easel surface. Accordingly, it is much easier to accomplish the critical focus by adjusting the vertical position of the easel 22 by means of the focusing platform 24, than it would be by moving the lens 20 (or the object 18).

Figure 4:
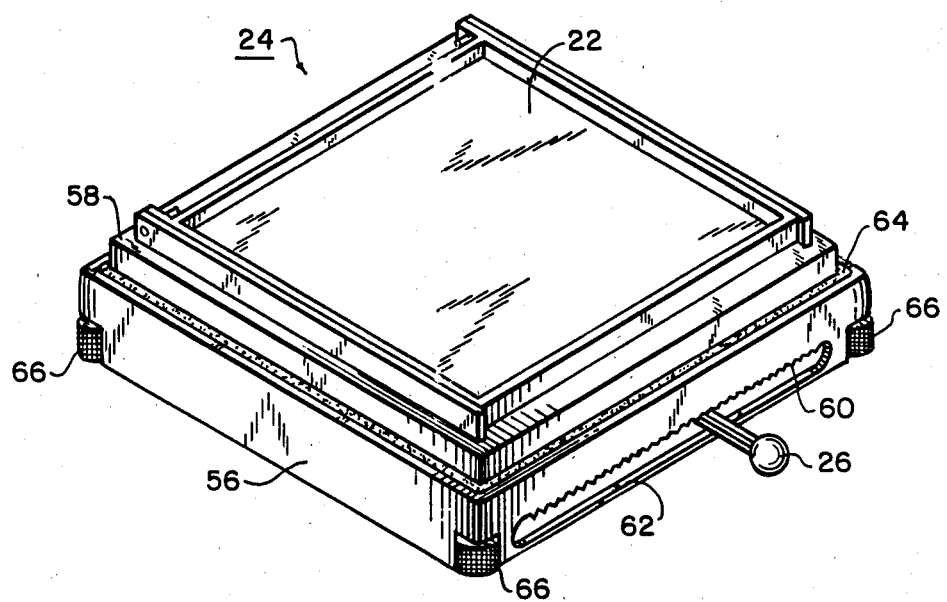
FIG. 4 is a perspective view of an adjustable photosensitive medium holding means which forms a particularly unique and valuable part of the combination of FIG. 1.

A preferred mechanism for the focusing platform 24 is more thoroughly shown and described below in connection with FIGS. 4 and 5 of the drawings.

As is conventional in enlarger support rails, the rail 12 includes rack teeth, as indicated at 28, and the enlarger projector 14 is supported by means of an arm 13 connected to the rail 12 by a slider 32. Slider 32 may be locked in position upon the rail by a locking knob 34.

The enlarger projector 14 preferably includes condensor lenses 36 and 38 for concentrating the light from source 16 upon the object 18 to be projected for enlargement.

The lens 20 is preferably positioned by a mechanism including a rack 40, and a cooperating pinion adjustment wheel 42.

FIGS. 2 and 3 illustrate in a schematic way how the depth of focus at the object to be enlarged decreases, and the depth of field at the image to be generated increases as the degree of enlargement is increased. FIG. 2 illustrates a situation where there is to be a lesser enlargement, and FIG. 3 illustrates a situation where there is to be a greater enlargement. In FIG. 2, the depth of focus is indicated at 44, as the distance between the dotted lines 46 and 48. In FIG. 3, the depth of focus is indicated by the distance 44A between the lines 46A and 48A. As seen from a comparison of the two, as the degree of enlargement increases from FIG. 2 to FIG. 3, the depth of focus decreases from 44 to 44A.

In FIG. 2, the depth of field at the image is indicated at 50, as the distance between dotted lines 52 and 54. The corresponding depth of field is illustrated in FIG. 3 at 50A as the distance between dotted lines 52A and 54A. As seen from a comparison of FIGS. 2 and 3, the depth of field 50A is considerably increased for the higher degree of enlargements over the depth of field 50 of FIG. 2 for the lesser degree of enlargement.

A comparison of FIGS. 2 and 3 illustrates why it is so difficult, particularly with a high degree of enlargement, as indicated in FIG. 3, to accurately focus, for a critical focus, by merely adjusting the position of the lens 20. Any change in the position of lens 20 drastically affects the narrow depth of focus. FIGS. 2 and 3 also illustrate why it is much easier to obtain the critical focus by precision adjustment of the position of the easel by means of the focusing platform 24, since a larger movement of the position of the photosensitive medium is required to change the focus by adjustment within the depth of field 50, or 50A. This advantage is much greater than indicated by FIGS. 2 and 3, because the actual ratio of the depth of field 50, 50A to the depth of focus 44, 44A is much greater than as illustrated.

A key element in carrying out the present invention is the focusing platform 24. A preferred form of the platform 24, together with easel 22, is illustrated in perspective in FIG. 4. The focusing platform includes a base member 56, and a support member 58, for supporting the easel 22. A mechanism is provided within the enclosure of the base member 56 to adjust the distance between the bottom of the base member 56 and the top of the support member 58 by movement of the adjustment lever 26. That mechanism is shown and described below in connection with the exploded view of FIG. 5.

Referring again to FIG. 4, the adjustment handle 26 preferably includes a built-in braking means. Preferably, the handle 26 is spring biased against the upper edge 60 of the slot 62 through which the handle 26 protrudes, in order to make contact with the edge 60 when the handle 26 is in a locked position. The edge 60 may preferably be roughened or serrated in order to enhance the braking or locking action.

The spring bias of the handle 26 is preferably carried out by simply constructing the handle of a flexible material which will inherently provide the spring bias effect.

When the handle is to be adjusted, it is pushed downwardly to release the brake action, and then moved horizontally to raise or lower the support member 58 with respect to the base member 56.

The edges of the support member 58 telescope within the edges of the base member 56. A cushioning gasket 64 is preferably provided between the inside edge of the base member 56 and the outside edge of the support member 58, as indicated at 64. Gasket 64 is preferably composed of a textile fabric, and is preferably permanently attached to the inside edge of base member 56. The telescopic relationship between the base member 56 and the support member 58 restrains relative rotation between these two members. This is important for the operation of the distance adjustment mechanism, as will appear more clearly from the description in connection with FIG. 5. At each corner of the base member 56, there is preferably provided a knurled knob 66 for adjusting a screw type leg in order to make the focusing platform absolutely parallel with the lens stage and the object to be enlarged.

While the upper surface of the platform 24 and the easel 22 are shown as substantially square, it will be understood that they are preferably of a conventional rectangular shape in a dimension such as 16 by 20 inches.

Figure 5:
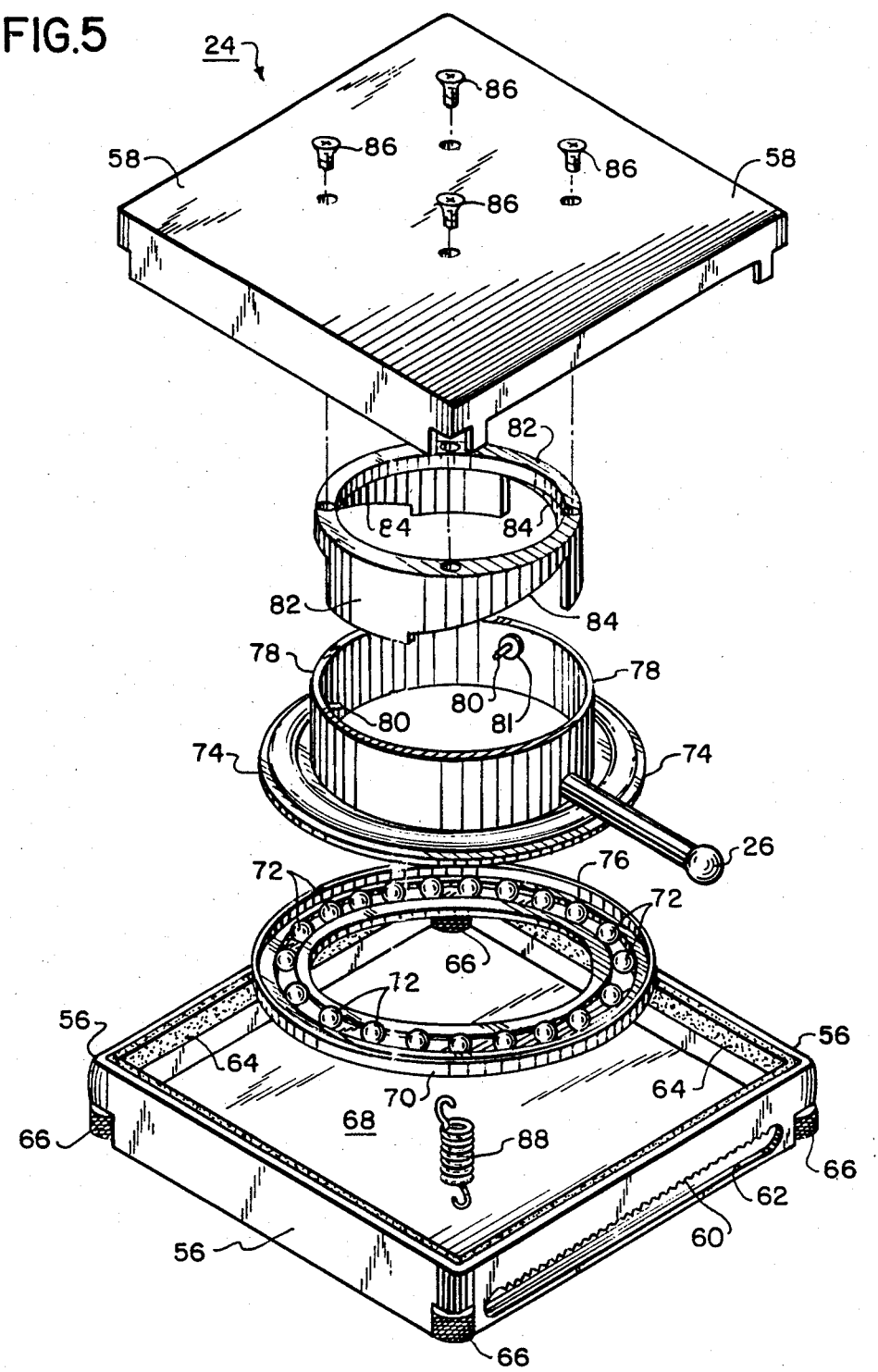
FIG. 5 is an exploded view of the holding means of FIG. 4.

Referring more particularly to FIG. 5, there is shown an exploded view of the focusing platform 24 with the easel 22 removed. Easel 22 normally simply rests upon the support member 58, and easels of different sizes may be easily substituted. The base member 56 and the support member 58 each preferably include boxlike enclosure sides, and are preferably in the form of box parts which provide a space within the enclosure formed by these members for the mechanism for adjusting the distance between the base member 56 and the support member 58. The base member 56 includes a substantially flat bottom plate portion 68. To the bottom plate portion 68, there is preferably securely attached a ball bearing race member 70 to accommodate a substantial number of circumferentially arranged bearing balls 72.

Cooperating with the ball bearing race 70 and the bearing balls 72 is an upper race member 74. When assembled, the two races are preferably maintained in assembled relationship by means of a lip 76 around the peripheral edge of race 70 which is bent down and formed over the outer edge of the race 74, but not tightly clamped to that lip, to permit relative rotation between the races. It will be seen that the assembly of the two races provided by the lip 76 causes the lateral and axial positions of the cam member 78 to be maintained, while permitting rotation of the cam member 78. The antifriction thrust bearing members 70 and 74 may be characterized as plate members which each have a semicircular cross section ball bearing race so that these two members together form a full circumferential ball bearing race to complete the antifriction thrust bearing structure. Firmly attached to the upper race 74 is a cylindrical member 78, which preferably carries three cam followers 80, only two of which are visible in the drawing. The adjustment handle 26 is rigidly attached to the cam follower cylindrical member 78.

A cylindrical cam member 82 is arranged to telescopically fit within the cylindrical cam follower member 78, and engage the cam follower pins 80. The cam follower member 82 includes three cam surfaces indicated at 84 which are arranged to engage with the cam follower pins 80. The cylindrical members 78 and 82 are each sometimes referred to herein as cam members, even though member 78 includes only cam followers 80. In order to provide for a minimum of friction, the cam follower pins 80 are preferably provided with needle bearings. A washer 81 of an anit-friction organic resin material is preferably provided on each cam follower pin 80. The material of the washer may be a material such as polytetrafluoroethylene, which is frequently referred to by its DuPont trademark name Teflon. The washers 81 provide a sliding bearing between the inside surface of cylindrical member 78 and the outside surface of cam member 82.

The cylindrical cam member 82 is preferably securely fastened to the underside of the support member 58, such as by means of flat head screws 86. It is apparent that the cam member 82 is restrained from rotation because that cam member is rigidly attached to the support member 58, and the support member 58 is restrained from rotation with relation to the base member 56 by reason of the telescopic fitted relationship between the edges of those members when the focusing platform is fully assembled.

As indicated in the lower part of the drawing, a tension spring device 88 is preferably provided to firmly connect the support member 58 to the base member 56 by means of suitable internal hook fasteners.

In operation, as the cam member 78 is rotated upon the ball bearing by manipulation of the handle 26 by the operator, the cam followers 80 force the nonrotatable cam member 82 up or down, depending upon the direction of movement of the handle 26, thus causing the support member 58 to be raised or lowered in relation to the base member 56. Because of the ball bearing, the operation of the device is very smooth and steady.

The ball bearing, which may be characterized as an antifriction thrust bearing, may be of the type which is sometimes used in a rotatable platform for the center of a dining table, commonly referred to as a "lazy-Susan".

It will be very apparent that there may be variations in the details of the structure. For instance, more or less than the three cam surfaces 84 which are disclosed may be employed, although three cam surfaces are preferred for simplicity and stability. Also, the positions of the cam members 78 and 82 may be interchanged without changing the operation of the device. If desired, the relationship of the outer edges of the base member 56 and the support member 58 may be interchanged. Thus, the outer edge of the support member 58 may lap over and surround the outside of the edges of the base member 56, instead of being telescoped inside.

Various other changes and modifications will occur to those who are skilled in the art.

While this invention has been shown and described in connection with a particular preferred embodiment, various alterations and modifications will occur to those skilled in the art. Accordingly, the following claims are intended to define the valid scope of this invention over the prior art, and to cover all changes and modifications falling within the true spirit and valid scope of this invention.

I claim:

1. A photographic enlarger apparatus comprising means to hold the object to be enlarged, means for illuminating the object to be enlarged, lens means for projecting the object as an image upon a photosensitive medium, a photosensitive medium holding means for holding the photosensitive medium on which the enlargement is to be produced, said object holding means and said lens means being movable with respect to said photosensitive medium holding means for determining the degree of enlargement and for achieving a focusing of the projected image upon the photosensitive medium, said photosensitive medium holding means including means for precision position adjustment of the distance to said lens means to achieve a critical focus of the projected image upon the photosensitive medium, said photosensitive medium holding means comprising a focusing platform including a base member and a photosensitive support member and said position adjustment means being arranged between said members and being operable to adjust the distance between said members to accomplish the critical focusing, said position adjustment means comprising a first cam means and a second cam means operable to cooperate with said first cam means, one of said cam means comprising at least one shaped cam surface and the other one of said cam means comprising at least one cam follower for following said cam surface, means for rotating one of said cam means with respect to the other, a first connecting means connected from said first cam means to said photosensitive support member and a second connecting means connected from said second cam means to said base member, one of said connecting means comprising a fixed connection from the associated member to the associated cam means which is a non-rotatable cam means and the other one of said connecting means comprising a connection from the associated member to the associated cam means which fixes the lateral and axial positions of said cam means with respect to the associated member while permitting rotation of the associated cam means with respect to said associated member, means for selectively rotating said last-named cam means to selected angular positions, and means for restraining relative rotation between said members.

2. Apparatus as claimed in claim 1 wherein the one of said connecting means which connects said rotatable cam means and said associated plate member comprises a rotatable plate member and an associated nonrotatable plate member and wherein each of said last-mentioned plate members includes a semicircular cross section ball bearing race so that said two last-mentioned plate members together form a full circumferential ball bearing race to provide an antifriction thrust bearing structure, said thrust bearing structure including a plurality of balls confined within said circumferential ball bearing race.

3. Apparatus as claimed in claim 1 wherein the one of said cam means which is rotatable includes a radially outwardly extending handle for manual rotation thereof.

4. Apparatus as claimed in claim 3 wherein there is provided a brake means for maintaining the rotational position of said rotatable cam means to maintain the focus.

5. Apparatus as claimed in claim 4 wherein said brake means is releasable to permit ease of rotation of said rotatable cam means when adjustment is required for focusing.

6. An apparatus as claimed in claim 1 wherein said cam surface cam means includes a plurality of shaped cam surfaces, and wherein said cam surface cam means is configured in a generally cylindrical shape, said cam surfaces comprising variations in the axial dimension of said cylindrical shape at different circumferential positions of said cylindrical shape, said plurality of cam surfaces having substantially identical contours, said cam follower cam means comprising a plurality of cam followers respectively positioned and arranged to cooperate with said plurality of cam surfaces.

7. An apparatus as claimed in claim 6 wherein said cam surface cam means includes three shaped cam surfaces and wherein said cam follower cam means includes three cam followers.

8. Apparatus as claimed in claim 6 wherein said cam follower cam means is the cam means which is rotatable and wherein said cam surface cam means is nonrotatable.

9. Apparatus as claimed in claim 5 wherein said brake is combined with said handle and is formed by a handle structure which is capable of being flexed in a direction parallel to the axis of rotation of said rotatable cam means, and said brake further including a nonslip edge means extending generally in a plane perpendicular to said axis of rotation and positioned to be engaged by said handle when said handle is not flexed to hold said handle in a selected rotational position, said handle being releasable by pushing said handle in an axial direction away from said non-slip edge means for rotation of said rotatable cam means, and then releasable into engagement with said edge means for retention of the positioning thereof.

10. Apparatus as claimed in claim 5 wherein said base member and said support member each include boxlike enclosure sides and wherein the boxlike enclosure sides of one of said last-named members telescopically fit within the boxlike sides of the other one of said last-named members, the open ends of said 8 respective last-named members with associated boxlike sides being aligned to face one another, and said means for restraining relative rotation between said last-named members including said boxlike sides telescoped together.

11. Apparatus as claimed in claim 10 wherein said boxlike sides of said two last-named members form a relatively loose telescopic relationship and wherein a textile fabric cushion material is positioned between said telescoped boxlike sides to minimize relative movement between said last-named members and to form a sliding bearing surface between the boxlike sides of one of said last-named members and the boxlike sides of the other one of said last-named members, said fabric cushion material being permanently attached to the boxlike sides of one of said last-named members.

* * * * *